(12) United States Patent
Nishiyama et al.

(10) Patent No.: US 7,852,647 B2
(45) Date of Patent: Dec. 14, 2010

(54) SWITCHING POWER SUPPLY DIGITAL CONTROL CIRCUIT PROTECTING FROM MAGNETIC SATURATION EFFECTS

(75) Inventors: Takayoshi Nishiyama, Takatsuki (JP); Takashi Hara, Kyoto (JP); Koichi Ueki, Takatsuki (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/760,628

(22) Filed: Apr. 15, 2010

(65) Prior Publication Data

US 2010/0195353 A1      Aug. 5, 2010

Related U.S. Application Data

(63) Continuation of application No. PCT/JP2008/065260, filed on Aug. 27, 2008.

(30) Foreign Application Priority Data

Oct. 19, 2007   (JP)   ............................. 2007-273173

(51) Int. Cl.
*H02M 7/44* (2006.01)
*G05F 1/56* (2006.01)
(52) U.S. Cl. ............................. 363/95; 363/98; 323/283
(58) Field of Classification Search ................ 323/283; 363/17, 21.05, 23.13, 95, 97, 98
See application file for complete search history.

(56) References Cited

U.S. PATENT DOCUMENTS 4,748,550 A    5/1988  Okado

| 7,315,159 B2* | 1/2008 | Nagai ........................ 323/283 |
| 2007/0085521 A1* | 4/2007 | Nagai ........................ 323/283 |

FOREIGN PATENT DOCUMENTS

| JP | 64-027786 A | 1/1989 |
| JP | 1-129772 A | 5/1989 |
| JP | 2001-275364 A | 10/2001 |
| JP | 2004-297943 A | 10/2004 |
| JP | 2005-20927 A | 1/2005 |
| JP | 2005-312139 A | 11/2005 |

OTHER PUBLICATIONS

Official Communication issued in International Patent Application No. PCT/JP2008/065260, mailed on Nov. 25, 2008.

* cited by examiner

*Primary Examiner*—Jeffrey L Sterrett
(74) *Attorney, Agent, or Firm*—Keating & Bennett, LLP

(57) ABSTRACT

A switching power supply apparatus includes a transformer or an inductor, a switching element connected to the transformer or the inductor and configured to perform switching of an input power supply, and a switching control circuit including a digital control circuit configured to sample voltage values and/or current values and control on and off of the switching element in accordance with the voltage values and/ or current values. The number of points of sampling is set to n or more points, where n is an integer greater than 3, in an ON period of the switching element except at around a turn-on point or a turn-off point of the switching element. The presence or absence of magnetic saturation of the transformer or the inductor is detected on the basis of whether or not a slope of change in current value over time is larger than a predetermined value, and circuit operation is protected from the effect of magnetic saturation. Thus, the presence or absence of magnetic saturation can be rapidly and precisely detected without the influence of switching noise.

2 Claims, 5 Drawing Sheets

SWITCHING POWER SUPPLY DIGITAL CONTROL CIRCUIT PROTECTING FROM MAGNETIC SATURATION EFFECTS

BACKGROUND OF THE INVENTION

1. Field of the Invention

The present invention relates to a switching power supply apparatus which performs switching control using digital control circuits.

2. Description of the Related Art

One type of protection circuit which is generally provided in a switching power supply apparatus is an overcurrent protection circuit. An overcurrent protection circuit detects a current flowing through a main switching element and turns off the main switching element when the current value reaches a predetermined value (see, Japanese Unexamined Patent Application Publication No. 2005-312139).

FIG. 1 illustrates an example of a switching power supply apparatus in Japanese Unexamined Patent Application Publication No. 2005-312139.

In the switching power supply apparatus illustrated in FIG. 1, a series circuit composed of a primary winding 2a of a transformer 2 and a semiconductor switching element 3 is connected to opposite ends of a direct current power supply 1. A diode 4 is connected to a secondary winding 2b of the transformer 2. Energy accumulated in the transformer 2 during an ON period of the switching element 3 is supplied to a load via the diode 4 during an OFF period of the switching elements 3. A current flowing through the switching element 3 is converted into a voltage signal by a resistor 6. The voltage signal is rectified by a diode 10, and the voltage is held for a predetermined time period by a charge-discharge circuit composed of a capacitor 11 and a resistor 12. When a comparator 7 and a reference voltage generator 8 detect that the held voltage is equal to or higher than a predetermined value, a control circuit 9 turns off the switching element 3.

By arranging the overcurrent protection circuit in this way, magnetic saturation of the transformer can be prevented. In addition, overcurrent during starting and output short circuit can be prevented without solutions such as an increase in size of the magnetic core of the transformer 2 for preventing saturation and an increase in capacity of the switching element 3.

Meanwhile, in general, when switching control is performed using an analog control circuit, a predetermined voltage signal is compared with a reference voltage by a comparator. Then, depending on the large-small relationship with the reference voltage, switching control is carried out. However, in the case of such analog control, output of the comparator may instantaneously vary due to the influence of switching noise superimposed on a voltage/current signal, which may result in unstable control. Insertion of a low-pass filter or the like for suppressing the influence of noise may lead to the problem of response delay.

The problem of noise influence and the problem of response delay caused by insertion of a low-pass filter arise also in a case where an overcurrent protection circuit is composed of an analog control circuit as in the case of the switching power supply apparatus in Japanese Unexamined Patent Application Publication No. 2005-312139 illustrated in FIG. 1.

The above problems may be overcome if switching control is performed by a digital control circuit. However, in order to detect overcurrent using a digital control circuit, a current flowing through a path to an object to be protected from overcurrent is converted into a voltage signal. Then, the voltage signal is sampled, and the absolute value of the sampled voltage signal is calculated. This process takes a long time to calculate the absolute value to be compared with a threshold value and leads to another problem of delay of determination of the presence or absence of magnetic saturation of a transformer or an inductor.

SUMMARY OF THE INVENTION

Preferred embodiments of the present invention overcome the above problems and provide a switching power supply apparatus that performs switching control using a digital control circuit and is capable of rapidly and precisely detecting the presence or absence of magnetic saturation.

A switching power supply apparatus according to a preferred embodiment of the present invention includes a transformer or an inductor, a switching element connected to the transformer or the inductor and configured to perform switching of an input power supply, and a switching control circuit including a digital control circuit configured to sample voltage values and/or current values to be controlled and control on and off of the switching element in accordance with the voltage values and/or current values, wherein the switching control circuit sets the number of points of the sampling to n points, where n is an integer greater than 3, in an ON period of the switching element and includes a detector arranged to detect the presence or absence of magnetic saturation of the transformer or the inductor on the basis of whether or not a slope of change in the current value over time is larger than a predetermined value and a protection controller arranged and programmed to protect circuit operation from the effect of magnetic saturation.

In this way, a signal in which the slope of change in current value over time is changed in accordance with magnetic saturation of the transformer or the inductor, and the presence or absence of magnetic saturation of the transformer or the inductor is detected on the basis of the slope of change over time. Thus, even under digital control, circuit operation can be appropriately protected from the effect of magnetic saturation without delay of determination of magnetic saturation of the transformer or the inductor.

The times of the sampling are preferably set within a period except at around a turn-on point or a turn-off point of the switching element.

With this configuration, a large variation of sampling values, which occurs in the case where sampling is performed at a turn-on point or a turn-off point of the switching element due to shifting of a sampling point, can be prevented. That is, since sampling is not performed at a turn-on point or a turn-off point, a slope of change in current value over time can be precisely calculated without negative effects of switching noise even if a sampling point is shifted.

According to a preferred embodiment of the present invention, in a switching power supply apparatus performing switching control using a digital control circuit, a switching power supply apparatus which can appropriately protect circuit operation from the effect of magnetic saturation, without being affected by switching noise and without delay of determination of magnetic saturation of the transformer or the inductor.

Other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
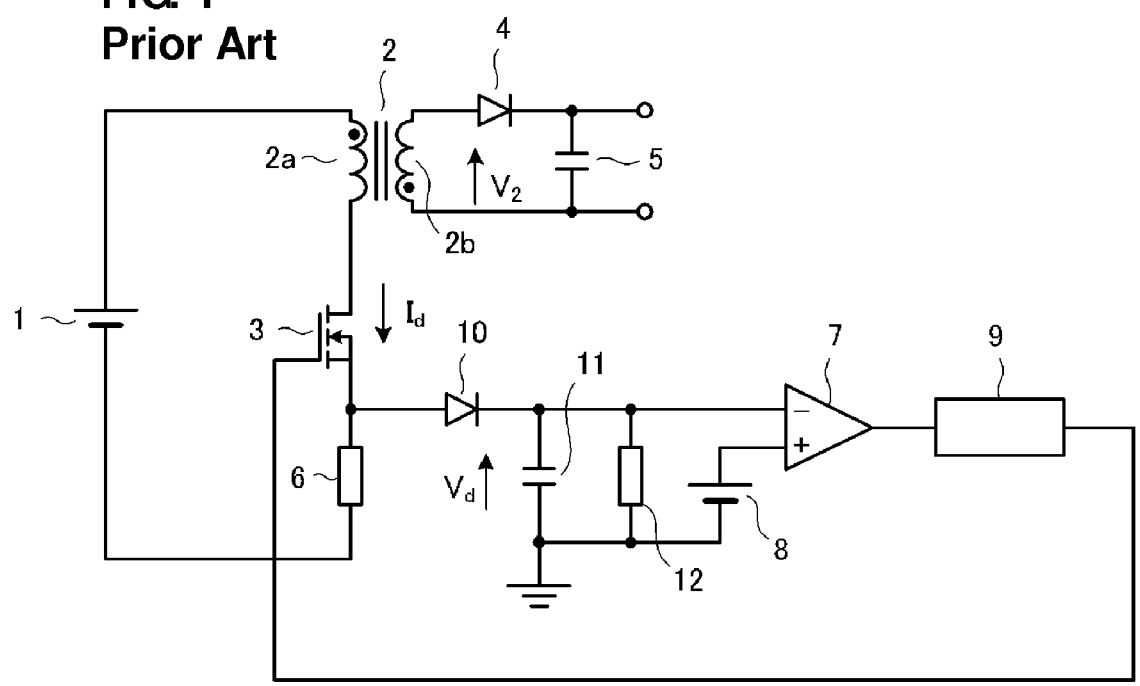
FIG. 1 is a circuit diagram of a switching power supply apparatus disclosed in Japanese Unexamined Patent Application Publication No. 2005-312139.
Figure 2:
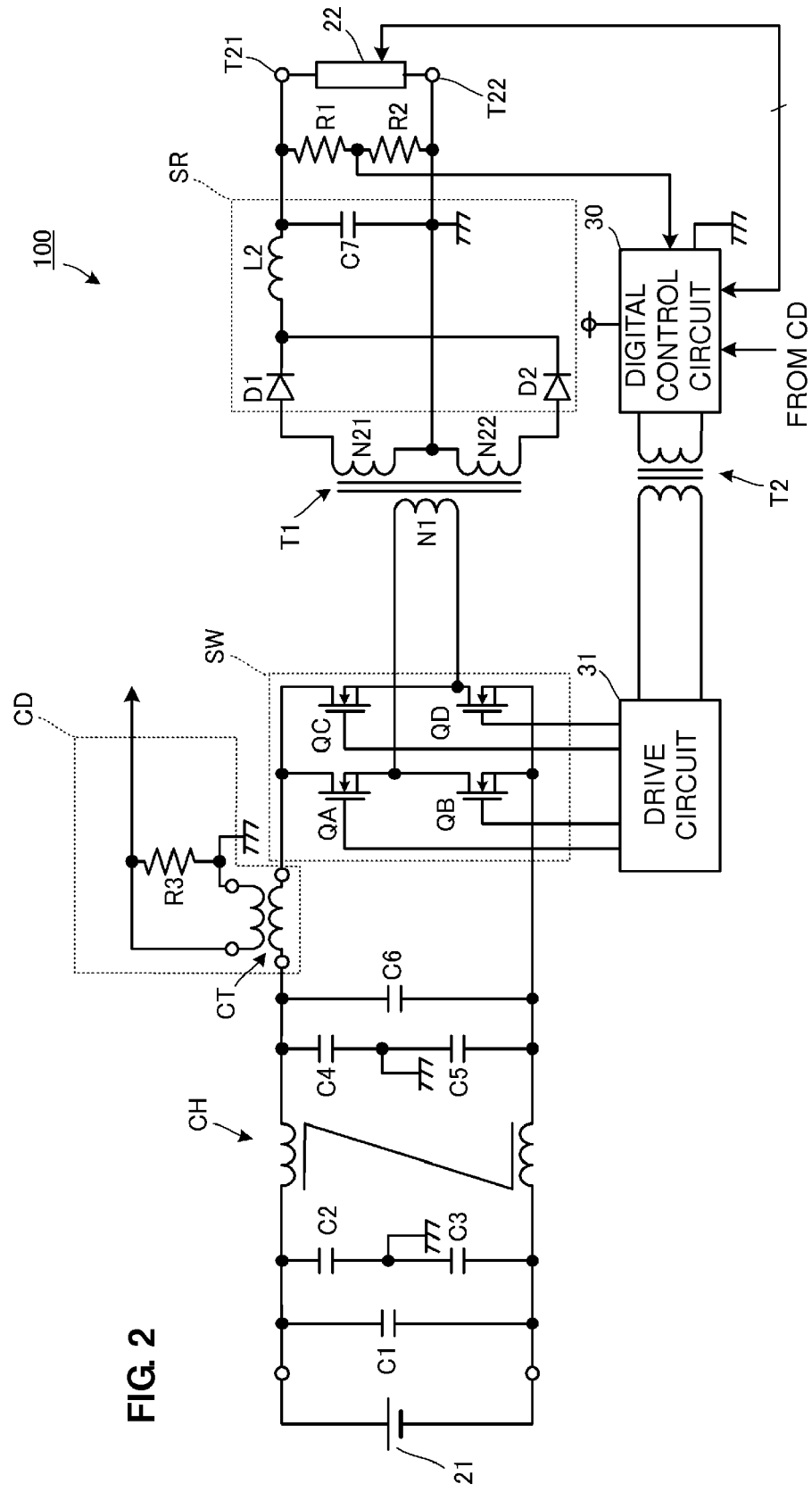
FIG. 2 is a circuit diagram of a switching power supply apparatus according to a preferred embodiment of the present invention.

FIG. 2 is a circuit diagram of a switching power supply apparatus 100 according to a preferred embodiment of the present invention. In FIG. 2, a transformer T1 has a primary winding N1 and secondary windings N21 and N22. A switching circuit SW including four bridge-connected switching elements QA, QB, QC, and QD is connected to the primary winding N1. A filter circuit including a common mode choke coil CH and bypass capacitors C1 to C6 and a current transformer CT are provided between an input power supply 21 and the switching circuit SW. A current detection circuit CD is provided by connecting a resistor R3 on the secondary side of the current transformer CT, so that a current flowing through the primary side is extracted as a voltage signal.

A drive circuit 31 is connected to the fourth switching elements QA to QD of the switching circuit SW.

A rectification smoothing circuit SR including rectifier diodes D1 and D2, an inductor L2, and a capacitor C7 is connected to the secondary windings N21 and N22 of the transformer T1. An output voltage is output from this rectification smoothing circuit SR to output terminals T21 and T22. A load circuit 22 is connected between the output terminals T21 and T22. In addition, an output voltage detection circuit including resistors R1 and R2 is provided between the output terminals T21 and T22.

A digital control circuit 30 preferably includes a DSP (Digital Signal Processor). Operation of this digital control circuit 30 is as follows.

A control pulse signal for the switching circuit SW is output to a pulse transformer T2. Thus, the drive circuit 31 inputs the control pulse signal via the pulse transformer T2 and drives the individual switching elements QA to QD of the switching circuit SW.

The drive circuit 31, on the basis of a rise point and a fall point of the pulse transformer T2, controls the phase in the pulse transformer T2 and alternately turns on and off pairs of the switching elements QA and QD and the switching elements QB and QC.

A voltage signal from the output voltage detection circuit including the resistors R1 and R2 is sampled at a point when the voltage reaches the peak and at a point immediately before the voltage reaches the peak, and digital values of the sampled voltage signal are calculated. Thus, the peak value of an output voltage V0 is detected.

A voltage signal from the current detection circuit CD is sampled at a point when the voltage reaches the peak or at a point immediately before the voltage reaches the peak, and digital values of the sampled voltage are calculated. Thus, the peak value of a current flowing through the primary winding N1 of the transformer T1 via the switching circuit SW is detected.

Further, a voltage signal from the current detection circuit CD is sampled on a predetermined cycle, and digital values of sampled voltage signal are sequentially calculated. Thus, change in instantaneous current over time is detected.

ON duties of the individual switching elements QA to QD of the switching circuit SW are controlled so that the peak value of the output voltage Vo maintains a predetermined value.

When the peak value of the current flowing through the primary winding N1 is about to exceed an upper threshold, overcurrent protection is performed by controlling ON duties of the individual switching elements QA to QD of the switching circuit SW to decrease the output voltage.

The presence or absence of magnetic saturation of the transformer T1 is detected on the basis of determination as to whether or not the slope of change over time in the instantaneous current flowing through the primary winding N1 of the transformer T1 is larger then a predetermined value. When the transformer T1 is being magnetically saturated, switching operation is stopped to protect circuit operation.

In the following, control/operation of the switching power supply apparatus 100 illustrated in FIG. 2 will be described.

Figure 3:
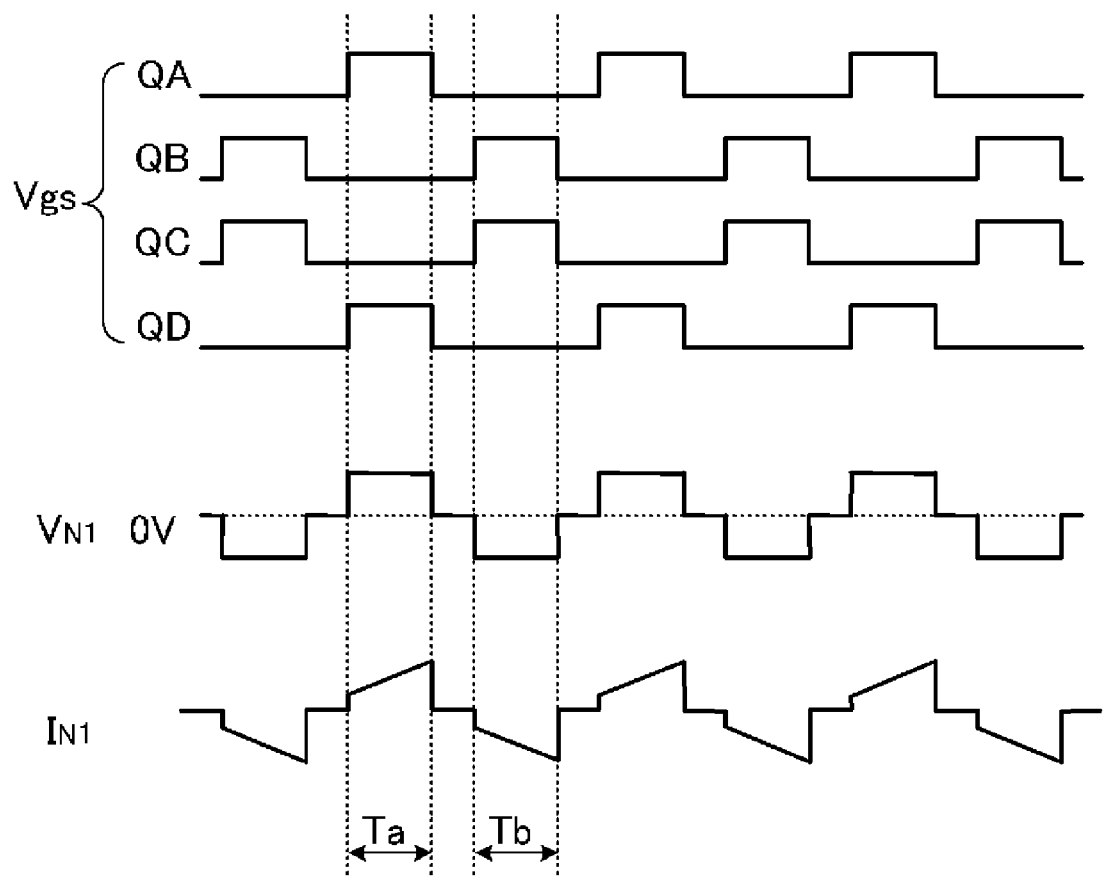
FIG. 3 is a waveform diagram corresponding to each component in the circuit diagram.

FIG. 3 is a waveform diagram of the switching power supply apparatus 100 illustrated in FIG. 2. In FIG. 3, Vgs represents gate-source voltages of the individual switching elements QA, QB, QC, and QD, $V_{N1}$ represents a voltage across the primary winding N1 of the transformer T1, and $I_{N1}$ represents a current flowing through the primary winding N1 of the transformer T1.

In FIG. 3, a period Ta is a period in which the switching elements QA and QD are turned ON and a current flows through the primary winding of the transformer T1 in a first direction. A period Tb is a period in which the switching elements QB and QC are turned ON and a current flows through the primary winding of the transformer T1 in a second direction.

By changing both the current flow periods Ta and Tb through the primary winding N1 of the transformer T1 to change ON duties, an output voltage on the secondary side is controlled.

Figure 4:
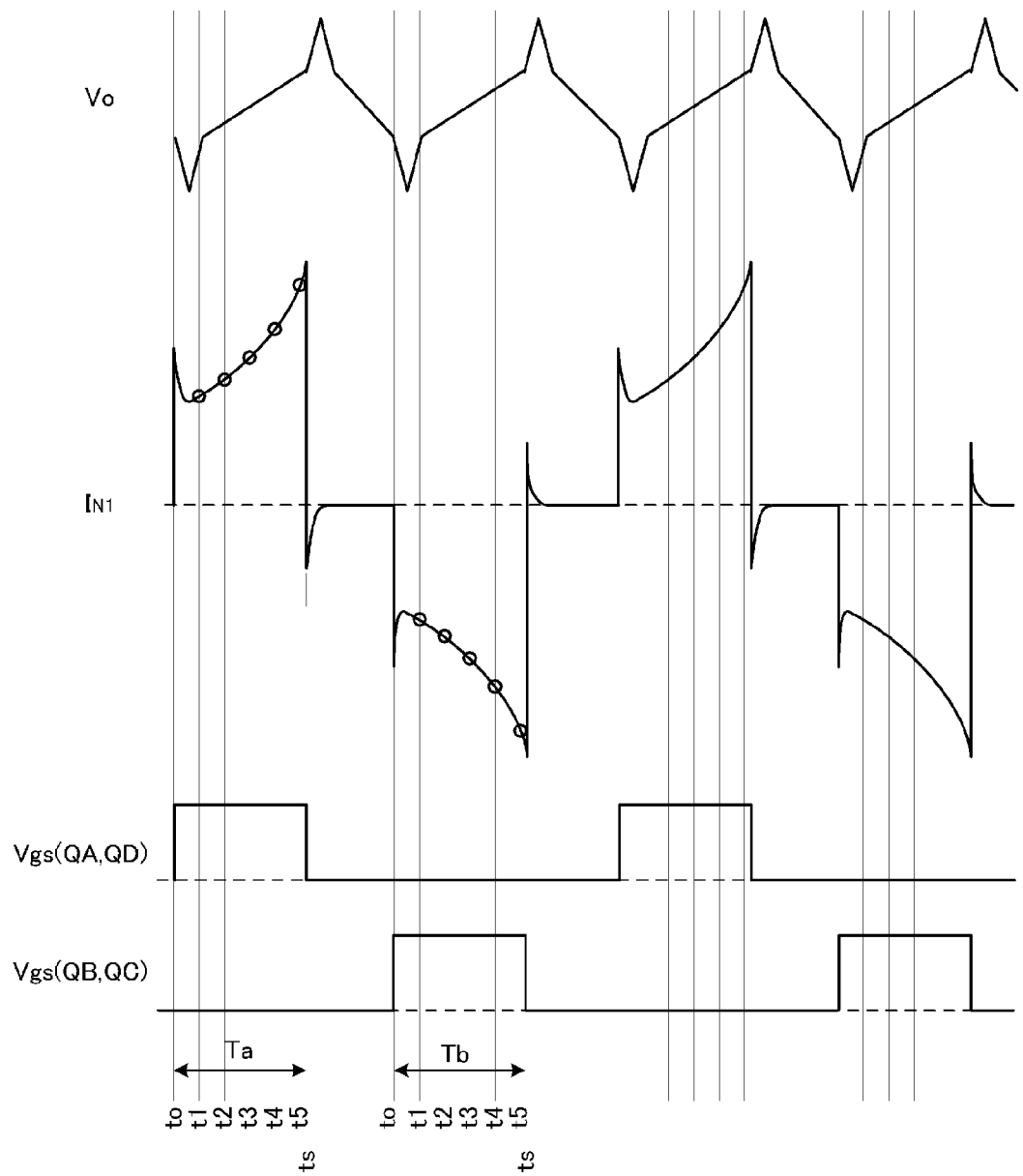
FIG. 4 illustrates a relationship between the current/voltage waveform in the switching power supply apparatus and the sampling time point.

FIG. 4 is an example of voltage/current detection timing of the switching power supply apparatus 100 illustrated in FIG. 2. In FIG. 4, the output voltage Vo is a waveform diagram which represents the output voltage of the output voltage detection circuit including the resistors R1 and R2 by enlarging the voltage axis. Vgs is a waveform diagram of gate-source voltages of the individual switching elements QA to QD.

Then, sampling is performed multiple times from a turn-on point to of the switching elements (QA, QD) and (QB, QC) during each predetermined sampling cycle Ts. In this example, sampling is performed at t1, t2, t3, t4, and t5. Sampling is not performed at around the turn-on point to and turn-off point ts of the switching elements (QA, QD) and (QB, QC). Thus, since sampling is not performed at the turn-on point and the turn-off point of the switching elements, the sampling is not adversely affected by switching noise even if there is a certain degree of shift in the sampling point.

In this way, the current $I_{N1}$ flowing through the primary winding N1 of the transformer T1 illustrated in FIG. 2 is sampled at multiple points during an ON period of the switching elements and a slope of change in the current $I_{N1}$ over time is calculated.

Figure 5:
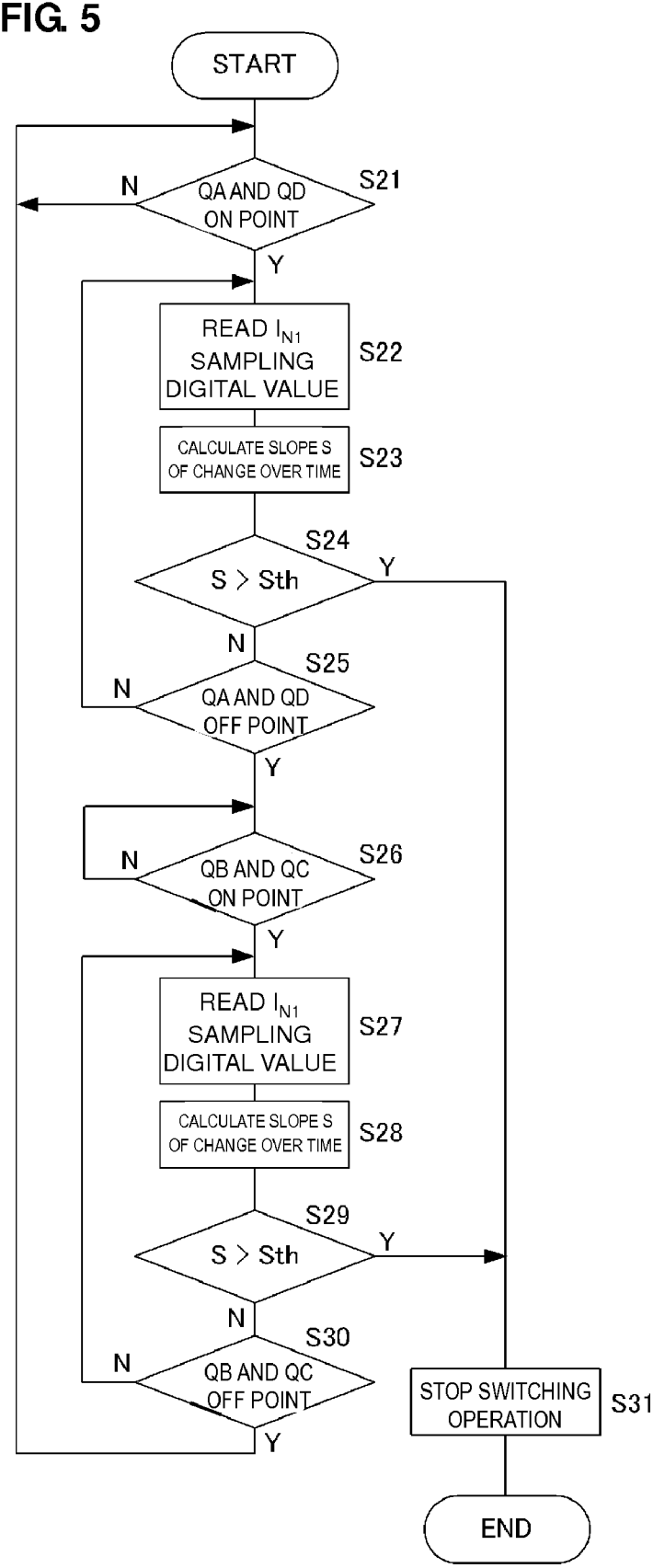
FIG. 5 is a flowchart illustrating processing of main components of the switching control device.

FIG. 5 is a flowchart illustrating a procedure of this processing. First, when the ON point of the switching elements QA and QD (start point of the period Ta illustrated in FIG. 4) is reached, the primary winding current $I_{N1}$ is sampled and digital values of the sampled current are read (S21→S22). Then, a slope S of change over time is calculated from a difference between a digital value and previous values (S23). When the slope S is larger than a threshold value Sth, the transformer T1 is assumed to have reached magnetic saturation and switching is stopped (S24→S31).

In a state where the slope S of change over time is not larger than the threshold value Sth, the above loop process is repeated until an OFF point of the switching elements QA and QD (end point of the period Ta illustrated in FIG. 4) is reached (S25,→S22,→S23→ . . . ). Since only a single piece of sampling data is obtained in the first loop processing, the slope S of change over time in Step S23 is calculated from the second loop.

Subsequently, when an ON point of the switching elements QB and QC (start point of the period Tb illustrated in FIG. 4) is reached, the primary winding current $I_{N1}$ is sampled and digital values of the sampled current are read (S26→A27). Then, a slope S of change over time is calculated from a difference between a digital value and the previous value (S28). When the slope S is larger than the threshold value Sth, the transformer T1 is assumed to have reached magnetic saturation and switching is stopped (S29→S31).

In a state where the slope S of change over time is not larger than the threshold value Sth, the above loop is repeated until an OFF point of the switching elements QB and QC (end point of the period Tb illustrated in FIG. 4) is reached (S30,→ S27,→S28→ . . . ). Since only a single piece of sampling data is obtained in the first loop processing, the slope S of change over time in Step S28 is calculated from the second loop.

In this way, when the transformer T1 is becoming magnetically saturated, switching operation is stopped so that circuit operation is protected.

While the above-described preferred embodiment has been described on the basis of an example of a full bridge DC-DC converter, the preferred embodiment may similarly be applied to DC-DC converters in various configurations such as push-pull, half bridge, flyback and forward converter and a chopper circuit such as a ripple converter to produce similar functions and effects.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A switching power supply apparatus comprising:
   a transformer or an inductor;
   a switching element connected to the transformer or the inductor and configured to perform switching of an input power supply; and
   a switching control circuit including a digital control circuit configured and programmed to sample voltage values and/or current values to be controlled and control on and off of the switching element in accordance with the voltage values and/or current values; wherein
   the switching control circuit is configured and programmed to set a number of points of sampling to n or more points, where n is an integer greater than 3, in an ON period of the switching element and includes a detector arranged to detect presence or absence of magnetic saturation of the transformer or the inductor on the basis of whether or not a slope of change in the current value over time is larger than a predetermined value and a protection controller arranged to protect circuit operation from effects of magnetic saturation.

2. The switching power supply apparatus according to claim 1, wherein the points of the sampling are set within a period except at around a turn-on point or a turn-off point of the switching element.

* * * * *